United States Patent [19]

Hurst, Jr.

[11] Patent Number: 4,520,402
[45] Date of Patent: May 28, 1985

[54] VIDEO APPARATUS WITH BURST LOCKED HETERODYNE CHROMA CONVERTER AND RESIDUAL TIME BASE ERROR CORRECTION

[75] Inventor: Robert N. Hurst, Jr., Cherry Hill, N.J.

[73] Assignee: RCA Corporation, Princeton, N.J.

[21] Appl. No.: 441,626

[22] Filed: Nov. 15, 1982

[51] Int. Cl.³ .............................................. H04N 9/44
[52] U.S. Cl. .................................... 358/324; 358/320
[58] Field of Search ................ 358/324, 325, 326, 320

[56] References Cited

U.S. PATENT DOCUMENTS

| | | | |
|---|---|---|---|
| 3,483,316 | 12/1969 | Hickok | 358/28 |
| 3,520,991 | 7/1970 | Rhee et al. | 358/28 |
| 3,965,482 | 6/1976 | Burrus | 358/8 |
| 4,200,881 | 4/1980 | Carnt et al. | 358/4 |
| 4,247,866 | 1/1981 | Wilber et al. | 358/8 |
| 4,283,738 | 8/1981 | Rutishauser | 358/11 |
| 4,286,282 | 8/1981 | Christopher et al. | 358/8 |
| 4,403,244 | 8/1983 | Fujishima | 358/325 |

*Primary Examiner*—Richard Murray
*Attorney, Agent, or Firm*—P. J. Rasmussen; P. M. Emanuel; R. G. Coalter

[57] ABSTRACT

A video disc player includes a phase locked loop (PLL) heterodyne converter for providing frequency translation and time base correction of the chrominance component of a composite video signal recovered when a disc is played. Residual time base errors due to the finite loop gain of the PLL are minimized by means of a phase modulator controlled by the PLL error signal. In one illustrative embodiment, the phase modulator is coupled so as to vary the phase of the translated chrominance output signal. In another embodiment, it is coupled to vary the phase of a demodulation carrier wave supplied to a chroma demodulator whereby, in either case, chroma streaking effects due to finite gain limitations of the PLL are minimized with no increase in loop gain thereby avoiding potential loop instabilities.

5 Claims, 4 Drawing Figures

4,520,402

VIDEO APPARATUS WITH BURST LOCKED HETERODYNE CHROMA CONVERTER AND RESIDUAL TIME BASE ERROR CORRECTION

FIELD OF THE INVENTION

This invention relates to video apparatus and particularly to video apparatus including a of heterodyne converter of the phase lock loop (PLL) type for providing frequency translation and time-base error correction of the chrominance component of a composite video signal supplied to the aparatusfrom a source such as a video disc or videotape.

BACKGROUND OF THE INVENTION

PLL heterodyne converters are known and used, for example, in video disc players to facilitate chrominance signal frequency translation and time-base error correction. An example of a player having such a converter is described in U.S. Pat. No. 3,965,482 entitled "VELOCITY CORRECTION CIRCUIT FOR VIDEO DISCS" which issued to T. W. Burrus, June 22, 1976, and is incorporated herein by reference. The Burrus player includes a turntable for rotating a video disc, a pick-up transducer for sensing capacitance variations representative of information recorded on the disc in the "buried subcarrier" (BSC) format and an FM demodulator responsive to signals derived form the pick-up transducer for providing a composite video signal which is time-base corrected and converted from the BSC format the an NTSC format by means of a video converter.

An advantageous feature of the Burrus player is that errors in the disc-pickup relative velocity and errors in the recovered chrominance signal frequency are corrected by means of a two-loop servo system. It includes a color burst keyed phase detector which produces a composite error signal representative of phase and frequency errors between the output of an NTSC reference frequency (3.58 MHz) crystal oscillator and the color burst component of the chrominance output signal produced by the video converter. A loop filter separates the composite error signal into two component error signals. One of the component error signals is applied to a stylus tangential position control transducer (known as an "arm stretcher") to form a principal feedback loop for minimizing velocity errors of the pickup stylus relative to the surface of the disc. By this means, time base errors in both the chrominance and the luminance components of the composite video output signal (due, for example, to disc warpage or eccentricity) are reduced. The other of the component error signals is applied to a voltage controlled oscillator which forms part of a PLL heterodyne converter. The auxiliary feedback loop then formed (which is nested with the principal feedback loop) provides additional reduction of phase and frequency errors of the chrominance component of the composite video output signal.

Various improvements to the burst locked heterodyne converter of Burrus have been proposed. As an example, U.S. Pat. No. 4,247,866 of Wilber et al., entitled "NESTED LOOP VIDEO DISC SERVO SYSTEM" which issued Jan. 27, 1981, and is incorporated herein by reference, shows a converter having an additional feedback loop which reduces the effect of certain transient disturbances of the primary and nested loops. As another example, U.S. Pat. No. 4,286,282 of Christopher et al., entitled "PERIODICALLY BIASED VIDEO DISC PLAYER SERVO SYSTEM" which issued Aug. 25, 1981 and is incorporated herein by reference, shows a converter in which the keyed phase detector error voltage holding capacitor is periodically precharged which has the effect, inter alia, of reducing the phase lock loop stabilization time. Video disc players having color burst locked heterodyne converters of the type described by Burrus and incorporating the improvements proposed by Christopher et al. and Wilber et al. have been produced commercially, for example, by RCA Corporation (e.g., the model SFT 100).

SUMMARY OF THE INVENTION

The present invention resides in part in the discovery of a significant contributing factor to a problem known as "chroma streaking" which has been observed when playing certain video disc records on a player having a PLL heterodyne converter of the general kind described above. The problem is manifested as streaks of color in the displayed image when a disc is played and appears to be characteristic of the disc per se, that is, some discs produce chroma streaking effects when played while the vast majority do not. This might be due, for example, to excessive warp or eccentricity or to time base errors introduced during mastering or replication of the disc.

The significant contributing factor referred to relates to a parameter of the PLL heterodyne converter. Specifically, it is recognized herein that the streaking problem is loop-gain related. It is further recognized herein that the visibility of chroma streaks could be substantially reduced if it were possible to increase the PLL loop gain in the frequency range of about 2000 to 3000 Hz. It is additionally recognized herein that loop stability considerations place practical limits on loop gain. Since the gain cannot be increased without limit, there will always be a residual phase error present in a PLL heterodyne chroma converter and thus residual uncorrected time-base errors will remain in the converter output signal.

In view of the foregoing a need has been found to exist for video apparatus having a PLL heterodyne converter in which residual time base errors are reduced without the necessity of increasing the loop gain, thereby avoiding potential loop instabilities. The present invention is directed to meeting this newly discovered need.

The principles of the present invention may be advantageously applied to video apparatus of a type including a PLL heterodyne converter means for providing frequency translation and time base correction of the chrominance component of a composite video signal supplied to the converter means. The converter means includes phase detector means for providing a phase error signal representative of a phase difference between a subcarrier reference frequency signal and the burst component of the chrominance output signal, the chrominance output signal tending to include residual time base errors not corrected by the converter means.

In accordance with the invention, the video apparatus is provided with first means for coupling the chrominance output signal to a video output terminal and for effectively imparting phase modulation to the coupled signal. A second means, coupled to the converter means and to the first means, controls the phase modulation of the coupled signal as a function of the phase error signal to reduce residual time-base errors of the coupled signal.

Figure 1:
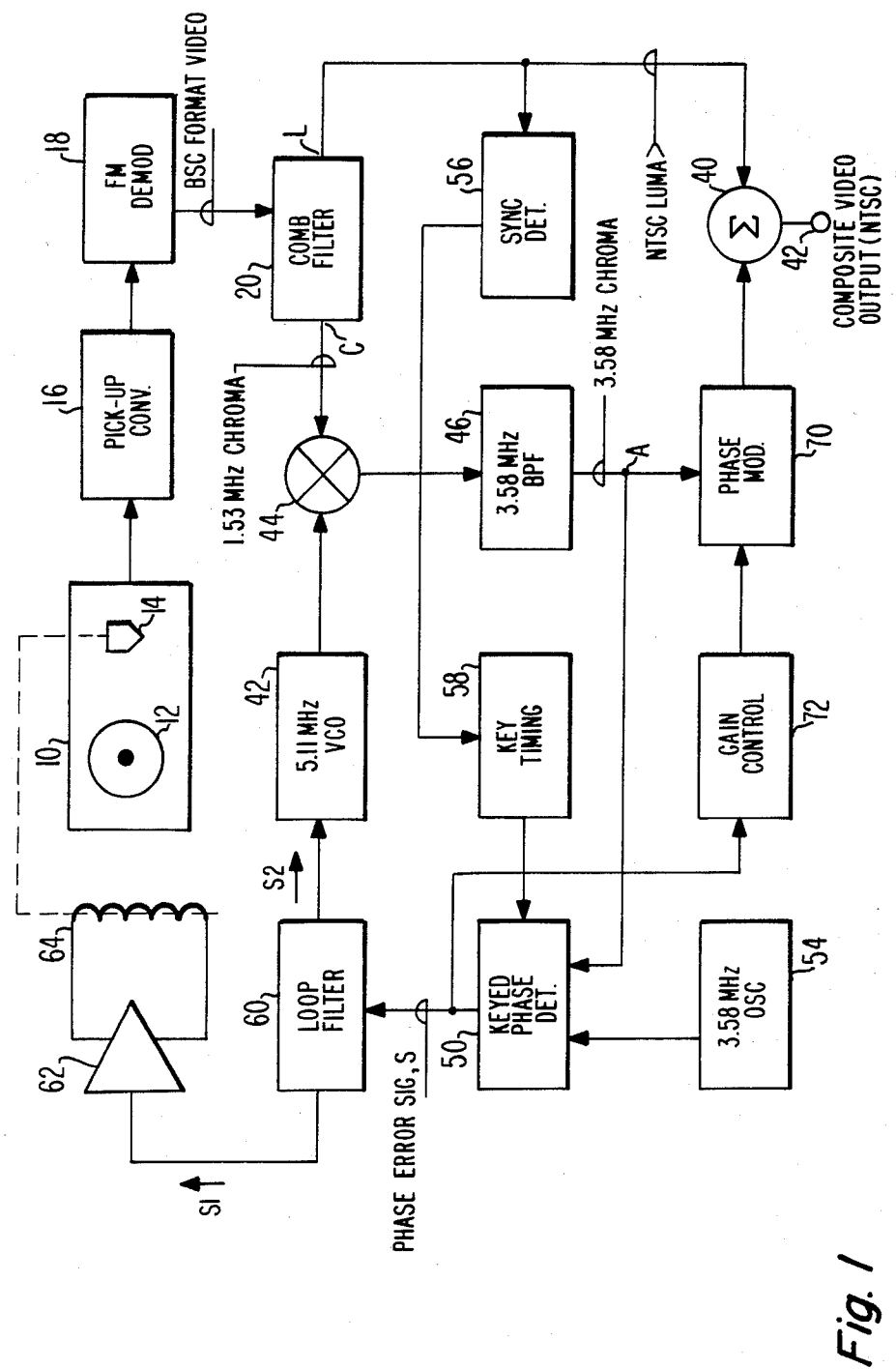
FIG. 1 is a block diagram of a video disc player embodying the invention.

The video disc player in FIG. 1 comprises a turntable 10 for rotating video disc 12 and a pickup transducer 14 for recovering video information from the disc. Illustratively, it will be assumed that the player is intended for use with records in which information is stored in the form of topological variations and recovered by sensing capacitance variations between pickup transcducer 14 and the record 12. The output of transducer 14 is coupled to the input of a pickup converter circuit 16 which comprises a capacitance-to-voltage converter responsive to capacitance variations between a stylus in transducer 14 and the record being played for producing an FM output signal voltage representative of the recorded information. Such records and suitable circuit for implementing the capacitance-to-voltage conversion function of pickup circuit 16 are well known. See, for example, U.S. Pat. No. 3,783,196 entitled "HIGH-DENSITY CAPACITIVE INFORMATION RECORDS AND PLAYBACK APPARATUS THEREFOR" which issued to T. O. Stanley, Jan. 1, 1974, U.S. Pat. No. 3,972,064 entitled "APPARATUS AND METHODS FOR PLAYBACK OF COLOR PICTURES/SOUND RECORDS" which issued to E. O. Keizer, July 27, 1976; and U.S. Pat. No. 3,711,641 entitled "VELOCITY ADJUSTING SYSTEM" which issued to R. C. Palmer, Jan. 16, 1973.

Video FM demodulator circuit 18 converts the FM signal produced by pickup circuit 1 to a video output signal. For purposes of illustrating certain features of the invention, it will be assumed that the video signals recorded on the disc are in the previously mentioned "buried subcarrier" (BSC) format rather than the convention NTSC format. As is known (see, for example, U.S. Pat. No. 3,872,498 entitled "COLOR INFORMATION TRANSLATING SYSTEMS", which issued to D. H. Pritchard, Mar. 18, 1975), in the BSC format, chrominance information is represented by a color subcarrier of the general form employed in the well-known NTSC format. However, the chrominance component in the BSC format is not located in the high end of the luminance signal video band, as in NTSC, but rather is buried in a lower portion of the video band. An illustrative subcarrier frequency choice is in the vicinity of 1.53 MHz, with the color subcarrier side bands extending ±500 KHz thereabout and with the luminance signal band extending well above the highest color subcarrier frequency (to 3 MHz, for example).

FM demodulator 18 illustratively may be of the pulse counting type or of the phase locked loop (PLL) type. A suitable pulse counting type FM demodulator is disclosed in U.S. Pat. No. 4,038,686 entitled "DEFECT DETECTION AND COMPENSATION" which is issued to A. L. Baker, July 26, 1977. An FM demodulator of the phase locked loop type is described in the U.S. Pat. No. 4,203,134, of T. J. Christopher et al. entitled "FM SIGNAL DEMODULATOR WITH DEFECT DETECTION" which issued May 13, 1980.

The BSC format composite video signal produced by demodulator 18 is applied to a comb filter 20 which separates the signal into chrominance and luminance components. Up-conversion of the chrominance component is necessary before the chrominance and luminance signals may be added (in summation circuit 40) to produce an NTSC composite video signal. This frequency translation is provided by voltage controlled oscillator (VCO) 42, multiplier 44 and band-pass filter 46. The output frequency of VCO 42 (when at the center of its control range) is nominally 5.11 MHz. Accordingly, multiplier 44, which mixes or multiples the BSC chrominance signal produced at the output of filter 20 with the output of VCO 42, produces output signals of nominally 3.58 and 6.64 MHz. Band-pass filter 46 passes the lower frequency signal (which corresponds to the NTSC chrominance signal standard) to summation circuit 40 where it is summed with the NTSC luminance signal produced at the output of filter 20 to thereby provide a composite video output signal at terminal 42 in the NTSC format for the video disc palyer. (Phase modulator 70, which couples the chroma signal from filter 46 to circuit 40 will be discussed subsequently.)

Multiplier 44 and band-pass filter 46 may be of conventional design. It is desirable, however, that VCO 42 feature high stability and be capable of wide frequency deviation. A preferred voltage controlled oscillator having a wide deviation range, is disclosed in the U.S. patent of T. J. Christopher and J. Wilber entitled "VARIABLE FREQUENCY OSCILLATOR" which issued Aug. 25, 1981.

The remaining elements of FIG. 1 comprise a phase locked loop form of heterodyne converter in which the output of a color burst keyed phase detector 50 is separated into two components, one being applied in a first feedback path (to transducer 14) for correcting velocity errors and the other being applied via a second feedback path (to VCO 42) for correcting frequency and phase errors of the chrominance component of the NTSC composite video output signal. Detector 50 compares the frequency and phase of the color burst component of the chrominance signal produced at the output of band-pass filter 46 with the standard NTSC reference frequency (3.579,545 MHz) produced by reference oscillator 54. Keying the phase detector 50 is provided by sync separator 56 which detects the horizontal synchronizing pulses in the NTSC format luminance signal produced at the output of filter 20 and suplies an enabling signal to a key timing unit 58 when each horizontal synchronizing pulse appears. Unit 58 then enables phase detector 50 during the so-called "back porch" interval of the horizontal synchronizing pulse where the color burst signal is located. Since phase detector 50 is only enabled during the color burst interval, its output voltage (which represents the servo system composite error signal S) is stored for the remainder of the horizontal line interval by means of a holding capacitor (not shown). (A preferred implementation of key timing unit 58 is described in the aforementioned Christopher et al. patent.)

Separation of the composite error signal S into component error signals S1 and S2 is provided by means of a loop filter 60 which may be of the type described by Baker. A preferred filter circuit design is given in the aforementioned Wilber et al. patent. Signal S1 is applied via a driver amplifier 62 to an arm stretcher transducer 64 for providing velocity error correction. Transducer 64 is mechanically coupled the the player pickup transducer 14 for controlling the tangential position of the pickup stylus relative to the video information track recorded on the video disc 12. If the disc is out-of-round, for example, transducer 64 changes the effective length of the pickup arm in consonance with rotation of the disc in a sense to compensate for its eccentricity. Arm stretcher transducers suitable for performing this function are described, for example in U.S. Pat. No. 3,983,318 entitled "VELOCITY CORRECTION SYSTEM WITH DAMPING MEANS" which issued to M. E. Miller and J. G. Amery, Sept. 28, 1976.

Signal S2 is applied to VCO 42 in a sense to minimize frequency and phase errors in the chrominance component of the NTSC composite video output signal. A lower frequency component of signal S2 provides correction for very low frequency errors as might be caused, for example, by power line frequency fluctuations influencing the turntable rotational velocity. A broad band component of S2 provides correction for relatively high frequency errors due, for example, to spurious variation in the recovered video signal.

Time-base errors of the chrominance signal are reduced in proportion ot the loop gain of the PLL heterodyne converter. Residual time-base errors of the chrominance signal at the output (node A) of filter 46 of the PLL heterodyne converter are corrected by means of phase modulator 70 and a gain control circuit 72. Modulator 70 provides the functions, in this example of the invention, of coupling node A to summing circuit 40 and of imparting phase modulation to the coupled signal. Gain control circuit 72 is connected between the output of phase detector 50 and the phase modulation control signal input of modulator 70 and controls the magnitude of the phase modulation as a function of the phase error signal S so as to reduce the residual phase errors of the coupled signal. Suitable circuit designs for control 72 and modulator 70 are presented subsequently.

It is apparent that chrominance signal residual phase error correction, applied as described, is provided in what may be termed an "open loop" or "feedforward" mode. One need not, therefore, alter the closed-loop gain of the PLL Heterodyne converter to obtain the supplementary time base correction effect provided by the gain control unit 72 and phase modulator 70 and thus the transient response or dynamic stability of the closed loop system is not degraded. Moreover, control 72 may be adjusted to a point where residual phase errors are essentially nulled which, as a practical matter, is an unattainable condition in a finite-gain, closed-loop system.

Figure 2:
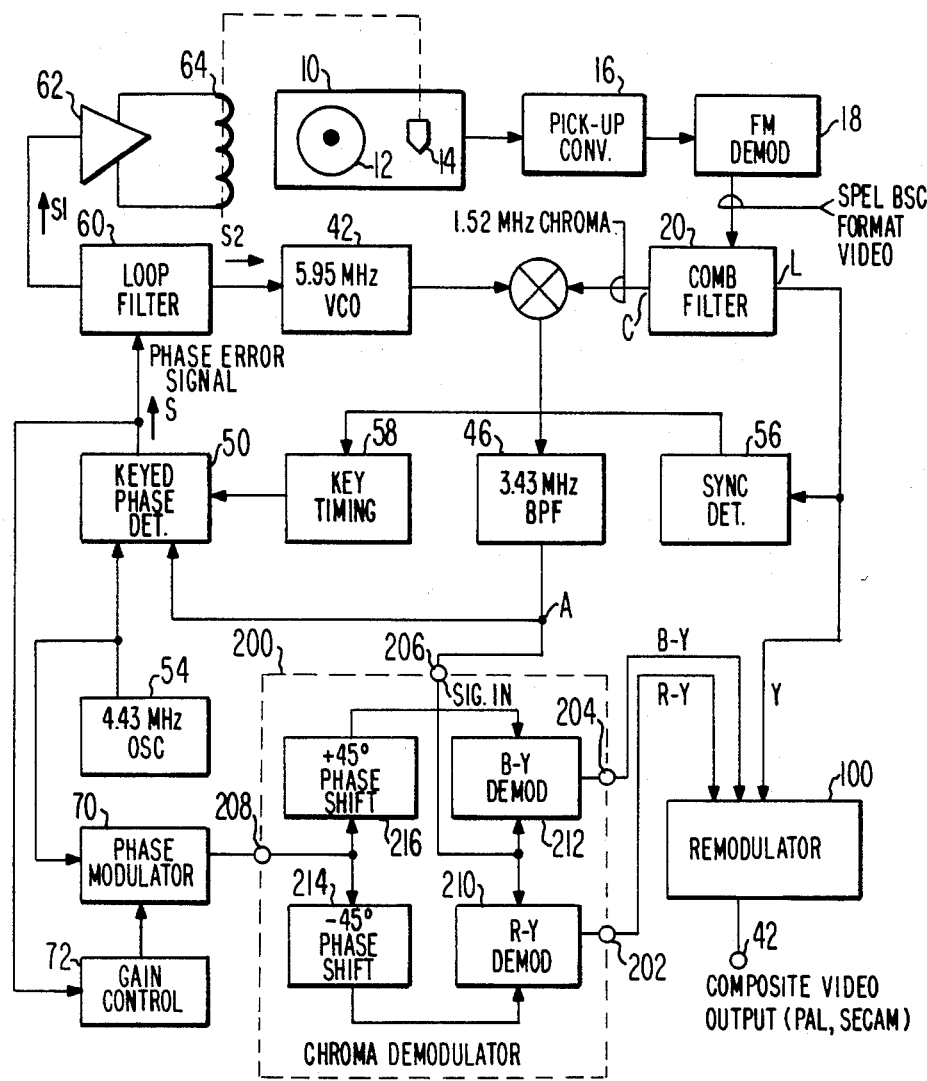
FIG. 2 is a block diagram illustrating a modification of the video disc player of FIG. 1.

The video disc player of FIG. 1 may be modified as shown in FIG. 2 for providing composite video output signals in PAL or SECAM format. Disc 12 will be assumed to be recorded in the format proposed by Carnt et al. in U.S. Pat. No. 4,200,881 in which burst is "de-switched" and recorded with a phase angle of 45° relative to the minus B-Y axis to facilitate subsequent chrominance signal processing. The frequencies of VCO 42 and oscillator 54 have been changed to 5.95 MHz and b 4.43 MHz to conform to a buried subcarrier frequency choice of nominally 1.52 MHz. The center frequency of filter 46 has been changed to 4.43 MHz, the PAL chrominance subcarrier frequency. Summing circuit 40 has been replaced by a remodulator 100 which has inputs connected to output terminals 202 and 204 of a chroma demodulator 200 for receiving baseband color difference signal R-Y and B-Y, respectively, and a further input connected to the output of filter 20 for receiving the luminance signal, L. Chroma demodulator 200 has a signal input terminal 206 connected to node A and a demodulations carrier wave (CW) input terminal 208 coupled to the input of oscillator 54 via phase modulator 70. Internally, demodulator 200 comprises R-Y and B-Y synchronous demodulators 210 and 212, respectively, the output of each being connected to a respective one of output terminals 202 and 204. Demodulator 210 has one input connected to the signal input terminal 206 and a second input coupled to the CW input terminal 208 via a −45° phase shift network 214. Demodulator 212 has one input connected to terminal 206 and another input coupled to terminal 208 via a +45° phase shift network 216.

Operation of the player signal recovery and heterodyne conversion circuitry is substantially the same as previously described. In this case, however, the chrominance signal at node A (4.43 MHz) is demodulated to baseband in the chroma demodulator 200 by individual R-Y and B-Y demodulators 210 and 212 which receive quadurature related 4.43 MHz phase reference signals from oscillator 54. Phase modulator 70, controlled by gain control 72, imparts phase modulation to the CW demodulation reference signal which counteracts the effects of residual time base errors not corrected by the PLL heterodyne converter. Remodulator 100 then processes the signals R-Y, B-Y and Y to provide a composite video output signal of a desired format (e.g., PAL, SECAM, etc.). Cart, et al., incorporated herein by reference, provides specific examples of suitable implementations of demodulators and remodulators.

Figure 3:
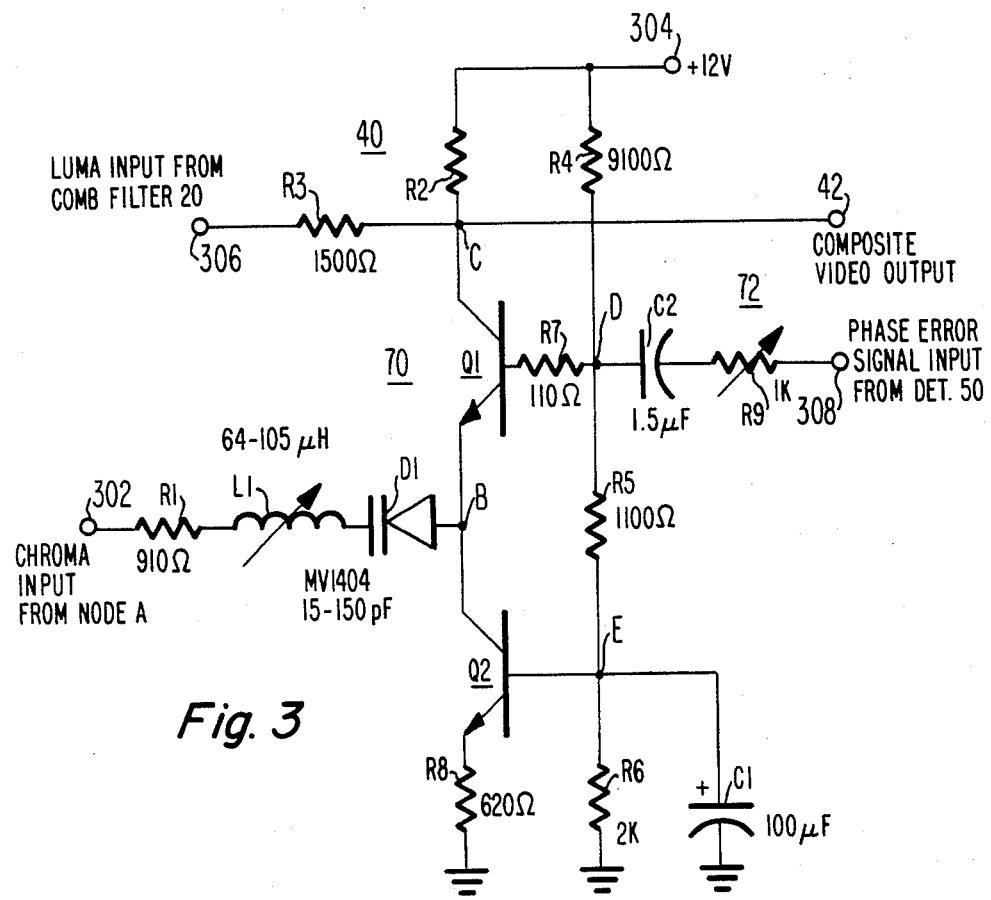
FIG. 3 is a schematic diagram illustrating a portion of the video disc player of FIG. 1.

FIG. 3 is exemplary of a specific circuit for providing the combined functions of phase modulator 70, gain control 72 and summing circuit 40 in the video disc player of FIG. 1. This circuit has been constructed (with the element values shown) and installed in a convention video disc player (RCA Model SFT-100). When the modified player was operated, a dramatic improvement in color quality (reduced streaking) was observed on records having excessive "orange peel" (i.e., surface roughness), eccentricity or warp and in players subject to large amounts of vibration or other time base error causing effects.

The circuit comprises an input terminal 302 for receiving the chrominance signal produced at node A. Terminal 302 is coupled to node B via a series resonant circuit comprising resistor R1, inductor L1 and varactor diode D1. Node B is the input of common base amplifier transistor Q1 having a collector load resistor R2 coupled to supply terminal 304 for receiving a source of supply voltage (+12 Volts). The luminance signal, L. produced at the output of comb filter 20 is applied to input terminal 306 which is coupled to the collector (node C) of transistor Q1 via resistor R3 where it is summed with the phase modulated chrominance signal produced by load resistor R2. Node C is coupled to output terminal 42 to provide the resultant and player composite video output signal.

DC bias for transistor Q1 is provided by a potential divider and a constant current source. The potential divider comprises resistors R4, R5 and R6 coupled in series between supply terminal 304 and ground. The junction of resistors R4 and R5 (node D) is coupled to the base of transistor Q1 via a low-valued parasitic suppression resistor R7. The junction of resistors R5 and R6 (Node E) is coupled to ground via an AC bypass capacitor C1 and to the base of a current source transistor Q2 having an emitter electrode coupled to ground via an emitter resistor R8 and a collector electrode coupled to node B. The phase error signal from phase detector 50 is applied to an input terminal 308 which is coupled to node D via a series-connected DC blocking capacitor C2 and a variable resistor R9.

In operation, the DC level of the chroma signal at terminal 302 is about 8.4 volts which is greater than that at node B (about 2.1 volts) whereby diode D1 is reverse biased and functions as a voltage variable capacitor for phase modulating the chroma signal coupled to node B in accordance with the amplitude of the phase error siganl applied to node D as controlled by the setting of resistor R9. Capacitor C1 removes the phase error signal from the base of the emitter current source transistor Q1 thereby preventing the phase error signal from appearing at the collector of transistor Q1, which otherwise would undesirably appear added to the composite video output signal. Circuit adjustments comprise tuning inductor L1 for resonance with varactor D1 at the chrominance subcarrier frequency (3.58 MHz) and adjusting resistor R1 until streaking effects are cancelled or minimized when playing a record known to have excessive time base errors.

It is instructive to note that the gain control circuit 72 includes a DC blocking capacitor C2 which effectively removes the DC component of the phase error signal applied to the phase modulator 70. This desirably prevents DC drift or offset variations of the PLL error signal from altering the bias of varactor diode D1 which otherwise could alter the tuning of the phase modulator resonant circuit (L1, D1).

Figure 4:
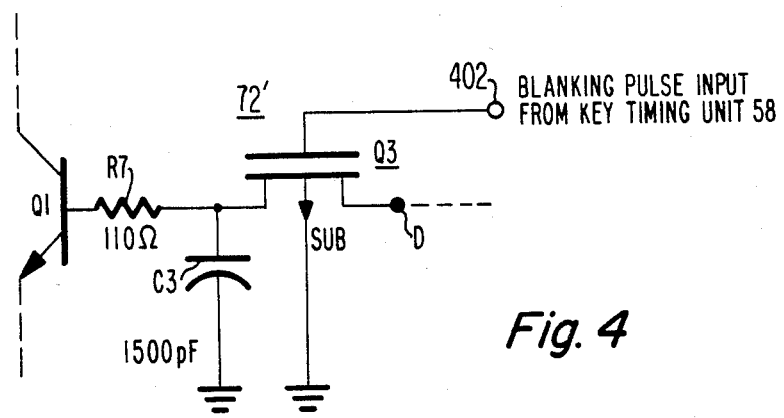
FIG. 4 is a circuit diagram illustrating a modification of the circuit of FIG. 3.

In the particular video disc player in which the circuit of FIG. 3 was tested, the key timing unit 58 supplies a signal to the phase detector 50 which clamps the phase error voltage holding capacitor to a reference level during horizontal blanking. As a result, the phase modulator is effectively disabled during the burst interval so that burst timing errors are not corrected. This problem may be corrected by interposing a sample and hold circuit in the circuit path of the gain control unit. In FIG. 4, the sample and hold is interposed between node D and transistor Q1 and comprises a field effect transistor Q3 having a conduction path connected in series with resistor R7 with a capacitor C3 connected between ground and the common connection of resistor R7 and transistor Q3. The gate of transistor Q3 is coupled to an input terminal 402 for receiving blanking pulses from the key timing unit 58 whereby the phase error signal is sampled and stored on capacitor C3 during horizontal blanking. Accordingly, with this modification residual time base errors of the color burst component of the chrominance signal are also corrected.

It will be appreciated that various changes and modifications may be made to the examples of the invention herein described. For examle, modulator 70 in the example of FIG. 2 may be interposed in the path between terminal 206 and node A and terminal 208 may be coupled directly to the output of oscillator 54 if desired. Also, the principles of the invention are not limited to video disc player applications but are of general utility and may readily be applied to other apparatus of the type having a closed-loop time-base error correction servo system.

What is claimed is:

1. In video apparatus of the type including a PLL heterodyne converter means for providing frequency translation and time base correction of the chrominance component of a composite video signal supplied to said converter means, said converter means including phase detector means for providing a phase error signal representative of a phase difference between a subcarrier reference frequency signal provided by a fixed frequency oscillator and the burst component of the converter chrominance output signal, said chrominance output signal tending to include residual time-base errors not corrected by said converter means, said apparatus including chrominance signal demodulator means having a first input terminal connected to receive said chrominance output signal, an output terminal for providing a demodulated chrominance output signal and a second input terminal for receiving said subcarrier reference frequency signal, the improvement, comprising:

phase modulator means coupled to said fixed frequency oscillator for supplying said subcarrier reference frequency signal to said second input terminal of said demodulator means; and circuit means coupled to said phase detector means for aplying said phase error signal to a modulation control terminal of said phase modulator means for imparting phase modulation to said subcarrier reference frequency signal to correct color shifts in said demodulated chrominance output signal caused by said residual time-base errors of said chrominance output signal of said heterodyne converter means.

2. Video apparatus as recited in claim 1 wherein said circuit means comprises:

a circuit path coupled between an input terminal of a loop filter means of said converter means and said modulation control terminal of said phase modulator means; and gain control means interposed in said circuit path.

3. Video apparatus as recited in claim 2 further comprising DC blocking means interposed in said circuit path.

4. Video apparatus as recited in claim 2 further comprising sample and hold means interposed in said circuit path.

5. Video apparatus as recited in claim 4 further comprising DC blocking means interposed in said circuit path.

* * * * *